Mar. 3, 1925.
A. SLAVICK
PLANTER
Filed Sept. 13, 1922  2 Sheets-Sheet 1
1,528,578
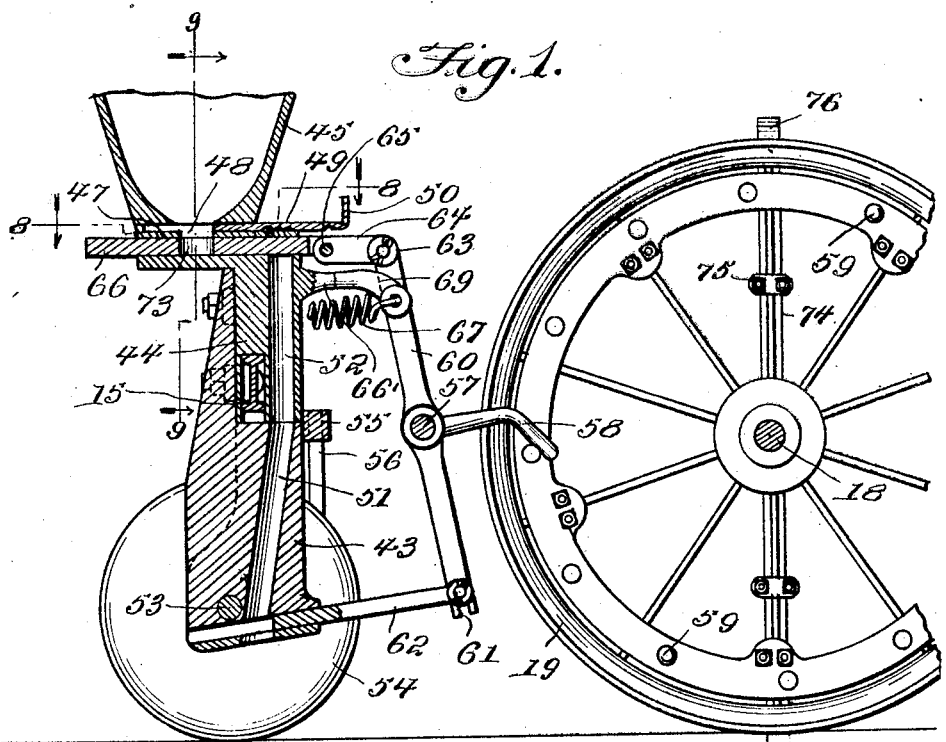
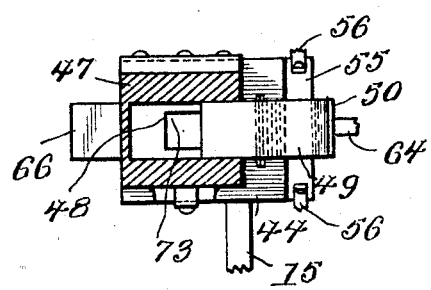
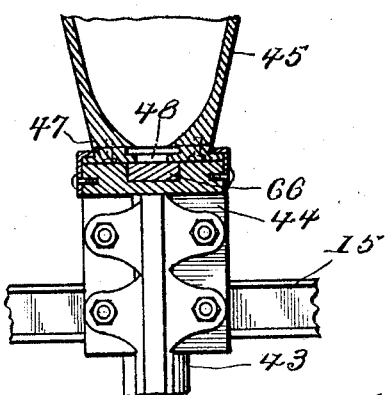
Adolph Slavick
INVENTOR
BY Victor J. Evans
ATTORNEY
WITNESS:

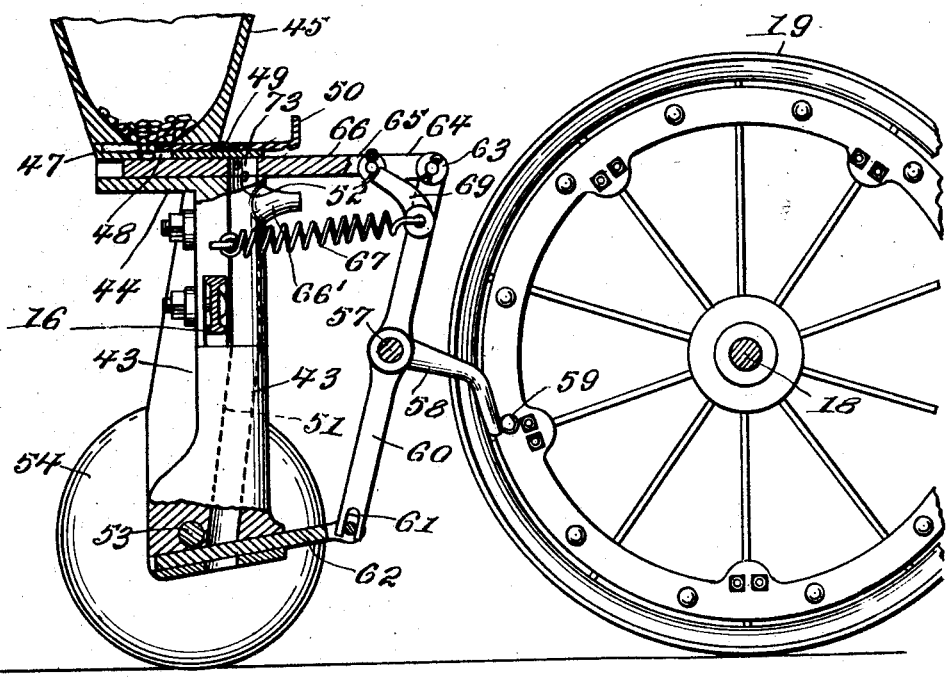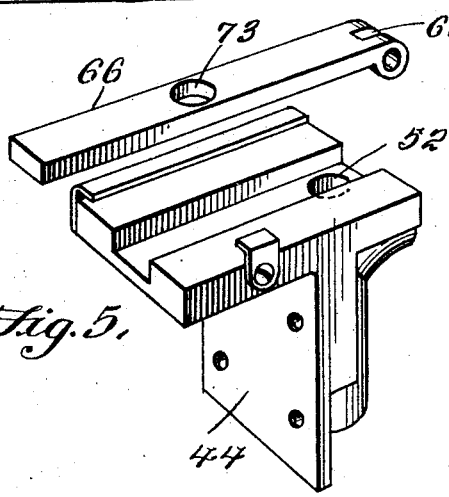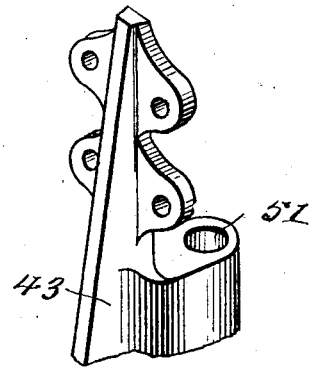

Patented Mar. 3, 1925.

1,528,578

UNITED STATES PATENT OFFICE.

ADOLPH SLAVICK, OF JUDSON, NORTH DAKOTA.

PLANTER.

Application filed September 13, 1922. Serial No. 588,036.

*To all whom it may concern:*

Be it known that I, ADOLPH SLAVICK, a citizen of the United States, residing at Judson, in the county of Morton and State of North Dakota, have invented new and useful Improvements in Planters, of which the following is a specification.

This invention relates to agricultural implements, particularly to planters, and has for its object the provision of a novel device designed primarily for planting corn, the device including a trip for dropping the seed actuated by a wheel instead of by the usual check wire employed in connection with ordinary corn planters.

An important object is the provision of a device of this character which may be used as a drill for planting other seeds instead of merely corn, the utility being manifest.

An additional object is the provision of a device of this character which will be simple and inexpensive in manufacture, efficient and durable in service and a general improvement in the art.

With the above and other objects and advantages in view the invention consists in the details of construction to be hereinafter more fully described and claimed and illustrated in the accompanying drawings in which:

Figure 1 is a detail section taken through one of the distributing hoppers of the planter and showing the trip mechanism, Figure 2 is a longitudinal section showing the action of the trip, Figure 3 is a cross sectional view taken on the line 3—3 of Figure 6, Figure 4 is a section on the line 4—4 of Figure 1, Figure 5 is a perspective view of the valve plate and its guide, Figure 6 is a detail perspective view of the dropping shoe.

Referring more particularly to the drawings the numeral 15 designates the side bars of the frame, which side bars are connected at their forward ends by a cross bar 16. Journaled transversely of the side bars is an axle 18 which has its ends carrying ground engaging wheels 19 which are relatively wide as shown so as to have a large surface bearing upon the ground.

Depending from the forward corners of the frame are supports 43 upon the upper ends of which are secured guides 44 above which are mounted hoppers 45 having open bottoms and having their tops closed by movable covers 46. Instead of saying that the bottoms of the hoppers are entirely open it might be preferable to say that the bottom of each hopper is closed by a metal plate 47 formed with an opening 48, the size of which may be varied by means of a movable strip 49 guided as shown and provided with an upturned end 50 constituting a handle. Each support 43 is formed with a passage 51 which leads to the bottom thereof and which communicates with an opening 52 in the guide 44.

Extending laterally from the sides of the supports 43 are spindles 53 upon which are journaled disks 54 which are for the purpose of cutting the ground. These disks are so arranged that they converge downwardly and forwardly to provide a space between them through which the grain falls from the passage 51 into the furrow cut by the disks. Secured to the rear side of the supports 43 are blocks 55 upon which are mounted depending scrapers 56 which engage the disks 54 and which are for the purpose of removing any dirt or mud which may cake thereon so that the disks will always be kept clean and sharp.

The seed dropping means consists of a rock shaft 57 which is journaled transversely of the frame bars 15 and which carries a trip arm 58 having a downwardly inclined end as clearly shown in Figure 6 of the drawings disposed in the path of travel of pins 59 which project from the inside face of one of the ground engaging wheels 19. Secured upon the ends of the rock shaft 57 are rocker arms 60 each of which is provided at its lower end with a fork 61 within which is pivoted a bar 62 which extends transversely of the passage 51 in the associated support 43. On the top of each rocker arm 60 is a fork 63 within which is pivoted a link 64 which is in turn pivotally connected with the forked end 65 of a plate 66 which is slidable through the adjacent guide 44 between the opening 48 in the bottom plate of the hopper and the opening 52 which communicates with the passage 51. A coil spring 67 is connected with one rocker arm 60 and with the adjacent support 43 for normally holding the plates 66 in such position as to prevent passage of grain out of the hoppers. On one support 43 is an abutment 66′ engaged by a stop arm 69 on the adjacent member or rocker arm 60 for limiting the movement of the parts in one direction.

Disposed against the outside of the right wheel is a marker formed as a bar 74 held against the spokes by U-bolts or clamps 75 and having pointed ends 76 which extend beyond the periphery of the wheel for penetrating engagement with the ground.

In the operation, the device is pulled over the field which has been previously plowed and disked or otherwise harrowed to prepare it for seeding. The hoppers 45 are of course filled with the corn kernels or other grain to be planted. The normal position of the parts is such that the plates 66 cut off communication between the hoppers and the passages 51. When the device is pulled along, at every rotation of the ground engaging wheels, the pins 59 will engage the trip arm 58 and swing the same downwardly, which will result in rocking the rock shaft 57 which carries the members 60. The upper ends of the members 60 will be moved rearwardly away from the hoppers and against the resistance of the spring 67. When this occurs whatever seed kernels are within the holes 73 in the plates 66 will be dragged to a point above the openings 52 in the guides and will drop through these openings into the passages 51 through which they will pass and fall onto the ground in the furrows made by the disks 54. As soon as the pin 59 passes out of engagement with the arm 58 the springs 67 will operate to return the members 60 and rock shaft 57 to original position, the plates 66 returning to normal position closing the openings 52 so that no more seed will fall until the trip arm is again operated at the next rotation of the ground wheel. After the seed is dropped into the furrow the ground wheels will operate to close the ground together on to the seeds so that they will be covered and ready for the action of nature to cause sprouting thereof.

The size of the wheels of the machine is such that the marking points 76 will make an impression in the ground exactly three feet and six inches apart. As the wheel turns these points or lugs come in contact with the ground at the side of each hill planted so that this mark will constitute a guide which will enable the operator to set the machine at the end of each row, so that the hills in the successive rows will be exactly in line when drilling corn.

From the foregoing description and a study of the drawings it will be apparent that I have thus provided a simply constructed and consequently inexpensive device for planting corn or other grain which has the great advantage of eliminating the use of the usual check wire and which will therefore be more convenient to use as avoiding a great deal of annoyance and difficulty. Owing to the simplicity of the construction and the fewness of the parts it is apparent that there is very little to get out of order and that the device should have a long life and satisfactorily perform all the functions for which it is intended.

While I have shown and described the preferred embodiment of the invention it is of course to be understood that I reserve the right to make such changes in the form, construction and arrangement of parts as will not depart from the spirit of the invention or the scope of the subjoined claim.

Having thus described my invention I claim:

In a second drop valve device for a planter seed chute having upper and lower valves pivoted respectively to the upper and lower ends of a rock arm journalled intermediate its ends in a planter frame to rock about a horizontal axis, a stop device for limiting the movement of the rocker arm in one direction comprising a hammer shaped stop arm carried by the rocker arm and extending forwardly therefrom at right angles thereto at a point just below the connection of the rocker arm with the upper valve, said stop arm having a flat contacting surface for engaging a complementary stop arm carried by the upper part of the seed chute and integral therewith.

In testimony whereof I affix my signature.

ADOLPH SLAVICK.